(12) United States Patent
Nagaraj et al.

(10) Patent No.: US 9,866,334 B2
(45) Date of Patent: *Jan. 9, 2018

(54) METHOD TO CONTROL THE EFFECTS OF OUT-OF-CELL INTERFERENCE IN A WIRELESS CELLULAR SYSTEM USING BACKHAUL TRANSMISSION OF DECODED DATA AND FORMATS

(71) Applicant: Alcatel-Lucent USA Inc., Murray Hill, NJ (US)

(72) Inventors: Shirish Nagaraj, Cedar Knolls, NJ (US); Subramanian Vasudevan, Morristown, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 398 days.

This patent is subject to a terminal disclaimer.

(21) Appl. No.: 14/216,169

(22) Filed: Mar. 17, 2014

(65) Prior Publication Data

US 2014/0199945 A1    Jul. 17, 2014

Related U.S. Application Data

(63) Continuation of application No. 11/409,162, filed on Apr. 21, 2006, now Pat. No. 8,700,042.

(51) Int. Cl.
*H04W 28/04* (2009.01)
*H04B 15/00* (2006.01)
(Continued)

(52) U.S. Cl.
CPC ......... *H04B 15/00* (2013.01); *H04B 1/71072* (2013.01); *H04J 11/004* (2013.01);
(Continued)

(58) Field of Classification Search
None
See application file for complete search history.

(56) References Cited

U.S. PATENT DOCUMENTS 6,757,270 B1 * 6/2004 Kumar ................. H04W 52/12
370/342
6,771,934 B2 * 8/2004 Demers ................ H04B 1/7107
375/148

(Continued)

FOREIGN PATENT DOCUMENTS

CN    1339229 A    3/2002
CN    1369154 A    9/2002
(Continued)

OTHER PUBLICATIONS

EP Application No. 07755560.5. Applicant: Alcatel-Lucent. Exam Report (9 pp) dated Feb. 8, 2016.
(Continued)

*Primary Examiner* — Daniel Lai
*Assistant Examiner* — Frank Donado
(74) *Attorney, Agent, or Firm* — Loza & Loza, LLP

(57) ABSTRACT

Successfully decoded data received from a mobile terminal as well as the transmission format of that data is relayed over the backhaul from a base station receiver that successfully decoded the mobile terminal's transmission to the base stations in the mobile terminal's active set that presumably were unable to decode the mobile terminal's transmission due to inadequate signal-to-noise ratio. A base station that receives this transmission from the relaying base station that did successfully decode and demodulate the mobile terminal's transmission is then able to reconstruct the data and subtract it from the total interference, thereby increasing the signal-to-noise ratio at this base station for its in-cell processing.

17 Claims, 4 Drawing Sheets

(51) Int. Cl.
  *H04B 1/7107* (2011.01)
  *H04J 11/00* (2006.01)
  *H04W 24/02* (2009.01)

(52) U.S. Cl.
  CPC .. *H04J 11/005* (2013.01); *H04B 2201/70702* (2013.01); *H04W 24/02* (2013.01)

(56) References Cited

U.S. PATENT DOCUMENTS

| | | | | |
|---|---|---|---|---|
| 2003/0003906 | A1* | 1/2003 | Demers | H04B 1/7107 455/424 |
| 2004/0162083 | A1* | 8/2004 | Chen | H04W 52/286 455/454 |
| 2006/0084389 | A1* | 4/2006 | Beale | H04L 1/1887 455/67.11 |
| 2007/0040704 | A1* | 2/2007 | Smee | H04B 1/7107 340/981 |
| 2007/0047495 | A1* | 3/2007 | Ji | A61K 31/501 370/335 |
| 2007/0165574 | A1* | 7/2007 | Srey | H04W 36/02 370/331 |
| 2007/0207812 | A1* | 9/2007 | Borran | H04L 1/1829 455/452.1 |

FOREIGN PATENT DOCUMENTS

| | | |
|---|---|---|
| CN | 1397107 A | 2/2003 |
| CN | 1613201 | 5/2005 |

OTHER PUBLICATIONS

3GPP Draft 25211CR142 (R1-02-0304), Deferring of mandatory UE support of SSDT to Rel. 4. 3GPP TSG RAN Meeting #15, Jeju, Korea (Mar. 5-8, 2002).

Chinese Pat. Appln. No. 2015100899568. Office Action & Search Report (dated Dec. 27, 2016).

\* cited by examiner

METHOD TO CONTROL THE EFFECTS OF OUT-OF-CELL INTERFERENCE IN A WIRELESS CELLULAR SYSTEM USING BACKHAUL TRANSMISSION OF DECODED DATA AND FORMATS

CROSS-REFERENCE TO RELATED APPLICATIONS/INCORPORATION BY REFERENCE

The present U.S. Utility Patent Application claims priority pursuant to 35 U.S.C. §120 as a continuation of U.S. Utility application Ser. No. 11/409,162 entitled "Method to control the effects of out-of-cell interference in a wireless cellular system using backhaul transmission of decoded data and formats", filed Apr. 21, 2006, which is hereby incorporated herein by reference in its entirety and made part of the present U.S. Utility Patent Application for all purposes.

TECHNICAL FIELD

This invention relates to wireless communications.

BACKGROUND OF THE INVENTION

In a wireless system, mobile terminals transmit and receive data over bi-directional wireless links from one or more base stations. The mobile terminal-transmit direction is known as the uplink and the mobile terminal-receive direction is known as the downlink. The set of base stations with which a mobile terminal is communicating is known as the active set of base stations for that mobile terminal, or that mobile terminal's active set. During normal conditions when a mobile terminal is within a base station's coverage area, the active set for that mobile terminal would generally be a single base station so that the active set includes only that one base station, which is that mobile terminal's serving station. When a mobile terminal, however, is within the range of multiple base stations and as such is in a handoff state, the active set includes the multiple base stations, which are each monitoring the signal from that mobile terminal and decoding it when able to do so. Only one of the base stations, however, is the serving base station for that mobile terminal and the other base stations are non-serving base stations. FIG. 1 shows three base stations (BSs) 101, 102 and 103 and their respective cell coverage areas 104, 105 and 106. Mobile terminal 107 is shown within the coverage area 104 of base station 101, which is its serving base station. Non-serving base stations 102 and 103, however, in addition to serving base station 101 constitute the active set for mobile terminal 107.

In a data system, on the downlink, the mobile terminal 107 receives data from only one base station but has the option of reselecting the serving base station in order to receive data from any other base station in its active set depending on from which base station the mobile terminal receives a signal with the highest signal-to-noise ratio. On the uplink, the serving and the non-serving base stations each attempts to demodulate and decode transmissions from the mobile terminal.

The capacity of a wireless system refers either to the number of mobile terminals that can simultaneously transmit or receive data, or the aggregate date rate of these mobile terminals, either expressed in mobile terminals/sector, erlangs/sector or data throughput/sector. The uplink capacity of the system can be different from its downlink capacity. For symmetric services, such as voice, (i.e., required throughput/data rate for a mobile terminal on the uplink is equal to that on the downlink), the overall system capacity is limited by the lower of uplink and downlink capacity. In current wireless systems specified by standards such as CDMA2000 1x, EV-DO Rev 0 and Rev A, HSDPA/EDCH, and WiMAX, the uplink has a substantially lower capacity than the downlink. This imbalance needs to be remedied for full use of downlink capacity and to maximize the number of mobile terminals than can operate symmetric services on the system.

In wireless systems that are based on direct spread or multi-carrier (optionally with precoding) CDMA, a plurality of mobile terminals within a sector (and across sectors) re-use a spreading sequence or a set of frequency tones to communicate with their respective active sets, while being differentiated by mobile terminal-specific codes. A mechanism for increasing uplink sector capacity is to perform successive interference cancellation on these transmissions at the base station transceiver. FIG. 2 illustrates base station noise rise components. As shown, at a base station receiver 200, the total rise over thermal noise in a sector consists of the composite signal 201 from the mobile terminals within that sector for which that base station is the serving base station, and the out-of-cell interference 202 caused by mobile terminals transmitting in adjacent sectors. The latter includes interference from those mobile terminals in the adjacent sectors for which base station receiver 200 is within these mobile terminals' active set but for which base station 200 is non-serving, plus the interference caused by other transmitting mobile terminals in other sectors that do not include base station 200 within each such mobile terminal's active set.

An illustrative method of interference cancellation is disclosed in co-pending patent application Ser. No. 10/401, 594 filed Mar. 31, 2003, and published as United States Patent Application Publication No. US2004/0192208 A1 on Sep. 30, 2004. Using such an interference cancellation method, if the decoding of any mobile terminal is successful, its signal is reconstructed and subtracted from the composite received signal at the base station. FIG. 3 shows a successive interference cancellation scheme at an exemplary base station receiver 300 that is the serving base station for four mobile terminals 301, 302, 303 and 304 within a sector of that base station receiver 300. The received power at base station receiver 300 from mobile terminals 301, 302, 303, and 304 is respectively P_1, P_2, P_3, and P_4. In addition, base station receiver 300 receives a composite signal power as the result of out-of-cell interference (IOC) caused by transmissions from mobile terminals out of the sector. When a particular transmission from a mobile terminal from within the sector is successfully decoded by the base station receiver, the transmission is reconstructed and subtracted from the composite signal at the base station, after which another received signal is demodulated, decoded, reconstructed and subtracted from the remaining composite signal. This process is repeated for each of the remaining signals. Advantageously, the signals from the mobile terminals that are decoded later in the demodulation and decoding process do not "see" the interference from transmissions from the mobile terminals that were decoded earlier in the sequence. FIG. 3 shows a successive calculation of the signal-to-noise ratios ($Snr\_1$-$Snr\_4$) of the four mobile terminals 301-304, respectively. Starting with mobile terminal 301, $Snr\_1$ is calculated as $P\_1/(P\_2+P\_3+P\_4+IOC+N)$, where N is the measurable thermal noise. The contribution from each is successively subtracted off from the received composite signal at the base station receiver, so that, for the last mobile terminal 304, Snr_4 is calculated as P_4/(IOC+N). Since the mobile terminals that are decoded later see a higher signal-to-noise ratio, they are capable of supporting either a higher rate of transmission and/or increased reliability.

In the above-described scenario, it is not possible for the base station receiver to successfully decode the transmissions of all the mobile terminals that have this base station sector in their active set. As a result, most of the out-of-cell interference received by a base station receiver cannot be deducted. Thus, as noted above, the signal-to-noise ratio for station 304 is still limited by this out-of-cell interference IOC.

Typically, the power control rule followed by mobile terminals is to either (i) follow power control commands from the serving sector in its active set, or (ii) follow a rule known as the or-of-the downs, whereby the mobile terminal lowers its power if any of the base stations in the active set instructs it to do so via a down power control command. While an or-of-the-downs power control ensures successful reception of the mobile terminal's transmission at at least one base station (presumably the one with the best uplink connection from the mobile terminal), it also ensures that the mobile terminal's transmission is not received with adequate signal-to-noise ratio to be successfully decodable at all of the base stations in the active set. Thus, this undecodable interference limits the capacity gain from a system employing successive interference cancellation. Even as mobile terminals within a sector transmit with ever increasing powers, in order to increase their signal-to-noise ratios at the base station receiver (and hence achieve higher data rates), their interference to adjacent sectors grows proportionately, thereby limiting the rates that can be achieved by mobile terminals in those sectors. In turn, the interference from the mobile terminals in adjacent sectors marginalizes the gains for the mobile terminals with the sector under consideration that increased their power in the first place.

A methodology is thus desired that enables a base station receiver to reconstruct and subtract the out-of-cell interference from the composite received signal so that the signal-to-noise ratio can be improved for all in-sector mobile terminals.

SUMMARY OF THE INVENTION

In an embodiment of the invention, successfully decoded data received from a mobile terminal as well as the transmission format of that data (e.g., the modulation and coding scheme used by the mobile terminal to transmit that data and the number of transmissions that were needed to achieve a successful decoding) is relayed over the backhaul (i.e., a link between base stations or between base stations and a central network entity such as a base station controller, a radio network controller, or a mobile switching center) from the base station receiver in the sector that successfully decoded the mobile terminal's transmission to the base stations in the active set that presumably were unable to decode this mobile terminal's transmission due to inadequate signal-to-noise ratio. A base station that receives this transmission from the relaying base station that did successfully decode and demodulate the mobile terminal's transmission can then reconstruct the data and subtract it from the total interference at that base station, thereby increasing the signal-to-noise ratio at this base station for its in-cell processing. The premise is that those sectors receiving such a transmission over the backhaul from a base station that was able to decode the data have been able to at least track the pilot signal of that mobile terminal. Using the decoded data and information about the coding or modulation scheme that are received over the backhaul, the channel (i.e., the multipath profile in the time domain or frequency domain channel response) is re-estimated and the waveform received from the mobile terminal is reconstructed and subtracted from the total interference at the base station. As a result, transmissions from other mobile terminals, which have yet to be successfully decoded at that base station, will experience a higher signal-to-noise ratio and thus an increased likelihood of being successfully decoded.

The methodology can be used in any system where out-of-cell interference limits the signal-to-noise ratio for one or more in-cell mobile terminals such as the system described above that uses successive interference cancellation or an OFDMA system that allows only one in-cell transmission over a given set of frequency tones.

BRIEF DESCRIPTION OF THE DRAWING

The present invention will be better understood from reading the following description of non-limiting embodiments, with reference to the attached drawings, wherein below.

DETAILED DESCRIPTION

Figure 1:
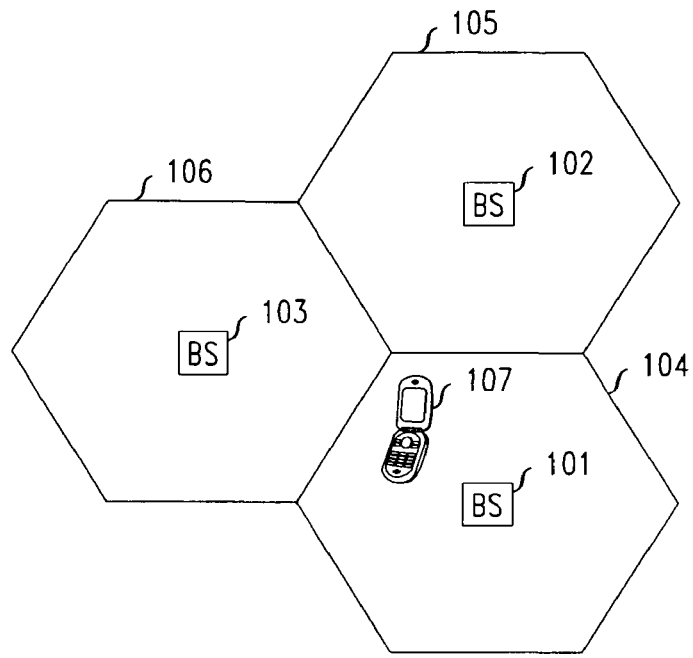
FIG. 1 shows a prior art arrangement of a mobile terminal and the serving base station and non-serving base stations in its active set.
Figure 2:
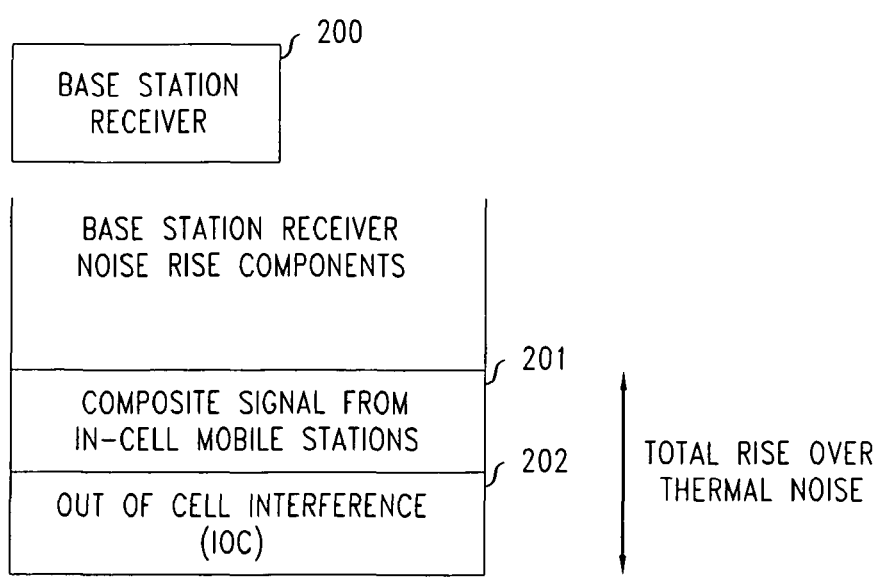
FIG. 2 illustrates base station noise rise components.
Figure 3:
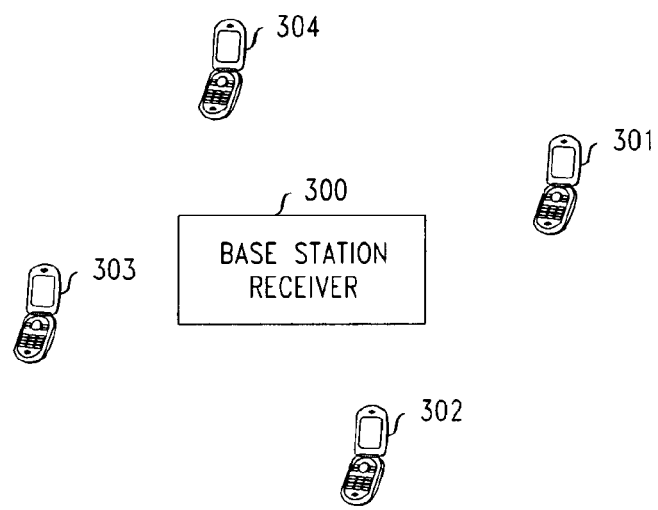
FIG. 3 shows a prior art successive interference cancellation scheme at an exemplary base station receiver that is the serving base station for four mobile terminals within a sector of that base station receiver.
Figure 3:
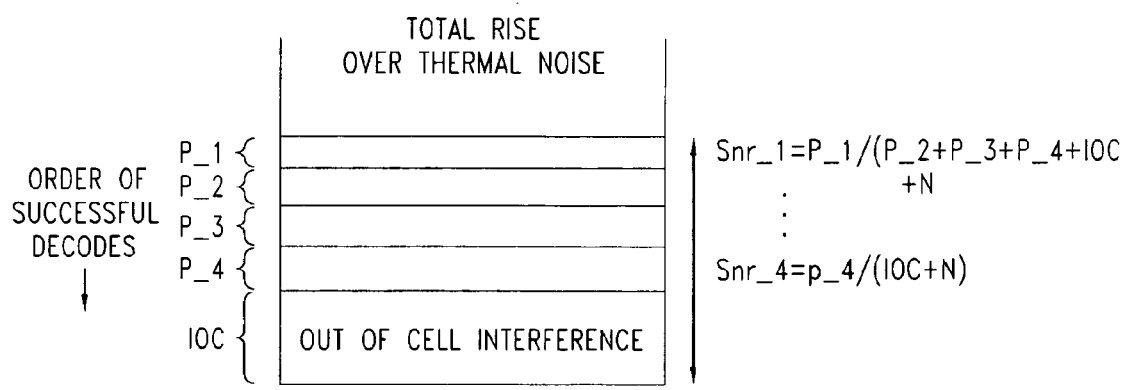
Figure 4:
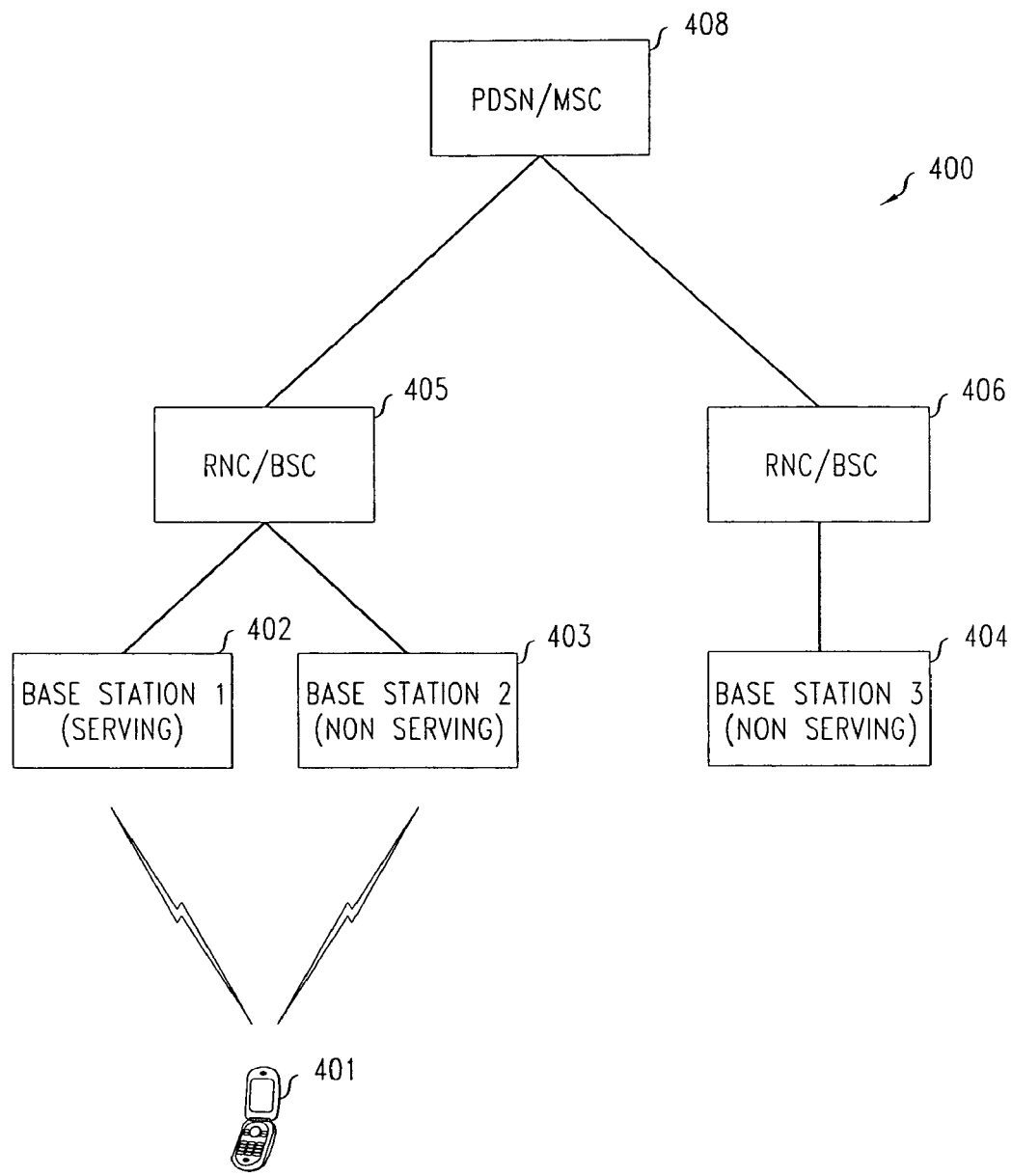
FIG. 4 show an arrangement in accordance with an embodiment of the present invention in which a base station sends information over the backhaul to other base stations in a mobile terminal's active set.

FIG. 4 shows a wireless communications system 400 in which the active set for a mobile terminal 401 includes base stations 402, 403 and 404. Base station 402 is the serving base station and base stations 403 and 404 are non-serving base stations. For illustrative purposes, serving base station 402 and non-serving base station 403 are connected to the same Radio Network Controller (RNC)/Base Station Controller (BSC) 405 and non-serving base station 404 is connected to RNC/BSC 406. RNC/BSC 405 and RNC/BSC 406 are connected to a common Packet Data Switching Node (PDSN)/Mobile Switching Center (MSC) 408.

In an embodiment of the present invention, when data that has been transmitted by mobile terminal 401 is successfully decoded by serving base station 402, that decoded data and the transmission format of that successfully decoded data is sent over the backhaul to the non-serving base stations 403 and 404 in the active set of mobile terminal 401. Specifically, the modulation and coding format, and the number of transmissions of the data that were required to achieve a successful decoding of that data are sent with the decoded data to these base stations. The decoded data and this information is sent by serving base station 402 to non-serving base station 403 through RNC/BSC 405, and is sent to base station 404 through RNC/BSC 405, PDSN/MSC 408 and RNC/BSC 406. If the functions of RNC/BSC 405 are collapsed into base stations 402 and 403, then base station 402 could send the information directly to base station 403.

Figure 5:
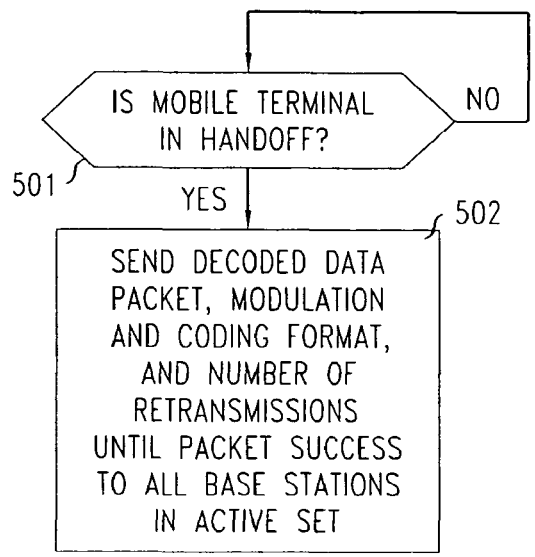
FIG. 5 is a flowchart showing the steps at a serving base station in accordance with an embodiment of the present invention.

FIG. 5 shows the steps performed at a serving base station, such as base station 402 in FIG. 4. At step 501 a determination is made whether the mobile terminal with which the base station is communicating is in a handoff state. Thus, if the active set of that mobile terminal is only that base station, the mobile terminal is not in a handoff state. If the active set is greater than one, then the mobile terminal is in handoff and other base stations in that active set are receiving and attempting to decode transmissions from that mobile terminal. If in handoff, then at step 502, the serving base station sends the decoded data packet and transmission format to all base stations in that mobile terminal's active set over the backhaul.

Figure 6:
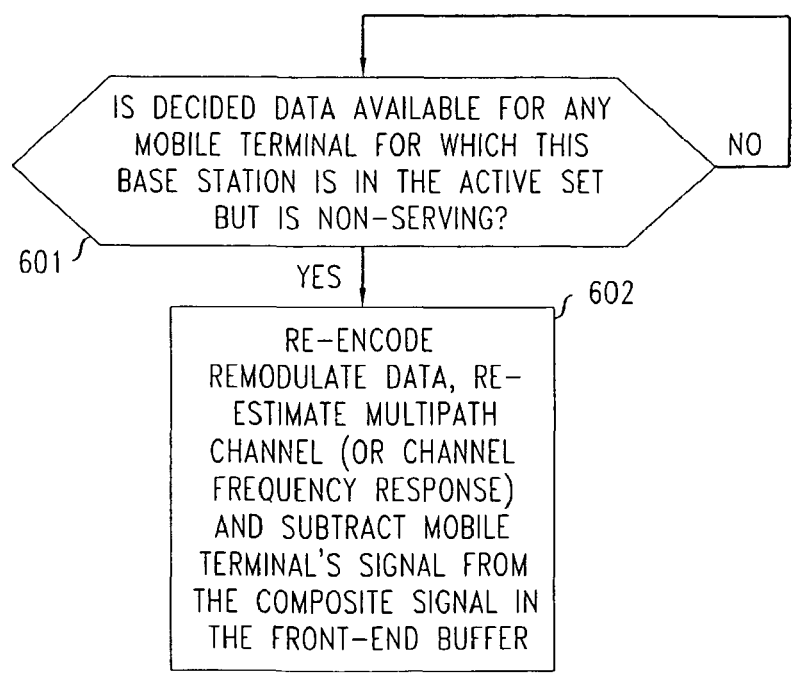
FIG. 6 is a flowchart showing the steps at a non-serving base station in accordance with an embodiment of the present invention.

FIG. 6 shows the steps performed at a non-serving base station, such as base stations 403 and 404 in FIG. 4. At step 601 a determination is made whether the decoded data and transmission format received on the backhaul from another base station had been sent from a mobile terminal for which this base station is in the active set but for which this base station is non-serving. If it has, at step 602, the decoded data received on the backhaul from the serving base station is re-encoded, and re-modulated and the multipath channel (or channel frequency response) are estimated. The signal from the mobile terminal is then subtracted from that mobile terminal's composite signal that is received at this non-serving base station and is stored in the non-serving base station's front end buffer. By so removing this out-of-cell interference at this non-serving base station, the signal-to-noise ratio at this base station for its in-cell processing is increased. More specifically, transmissions from other mobile terminals that have yet to be successfully decoded at this base station will experience a higher signal-to-noise ratio and thus an increased likelihood of being successfully decoded.

Although it has been assumed in the description above that it was the serving base station that successfully decoded a data transmission from the mobile terminal and relayed the decoded data and transmission format to the other non-serving base stations in the mobile terminal's active set, it should also be realized that at any given instant the serving base station may not have successfully decoded a mobile terminal's data transmission and one of the non-serving base stations in the active set may have in fact successfully decoded that transmission. In this case, it would be this non-serving base station, which successfully decoded that transmission that relays the decoded data and its transmission format to the other base stations in the active set, including the serving base station.

As previously discussed, the described methodology can be used in any system where out-of-cell interference limits the signal-to-noise ratio for one or more in-cell mobile terminals. Examples of such system include a system employing successive interference cancellation or an OFDMA system that allows only one in-cell transmission over a given set of frequency tones.

The above-described embodiment is illustrative of the principles of the present invention. Those skilled in the art can devise other embodiments without departing from the spirit and scope of the present invention.

The invention claimed is:

1. A method for use by a base station adapted for use in a wireless communication system that includes the base station and at least one other base station, wherein the base stations of said communication system are adapted to communicate with each other and with one or more mobile terminals, the method comprising:
   receiving, by the base station, a signal from a mobile terminal;
   carrying out a decoding operation, by the base station, on the received signal; and
   sending, by the base station, information comprising decoded data successfully produced by said decoding operation and a transmission format of the received signal to the at least one other base station of said communication system, wherein the transmission format includes a number of retransmissions that were required for the base station to successfully decode the data, and where the transmission format and the successfully decoded data are usable by the at least one other base station that receives the information to remove, from other signals received at the at least one other base station, interference attributable to transmission of the received signal.

2. The method of claim 1 wherein at least a plurality of the base stations of said communication system communicate with each other via a backhaul network.

3. The method of claim 1 where the transmission format comprises a modulation and coding format of the received signal.

4. A method at a base station of a wireless communication system comprising the base station and a plurality of other base stations, wherein the base station and the plurality of other base stations are adapted to communicate with each other and with one or more mobile terminals, the method comprising:
   receiving, by the base station, data from another base station included in the plurality of other base stations of the communication system wherein such data was successfully decoded by the another base station from a signal that was received by the another base station from a mobile terminal, the base station having also received a transmission format of the received signal, the transmission format including a number of retransmissions that were required for the another base station to successfully decode the data; and
   removing, by the base station using the successfully decoded data and the transmission format, interference from other signals received by the base station, wherein such interference is attributable to transmission of the received signal.

5. The method of claim 4 wherein at least a plurality of the base stations of said communication system communicate with each other via a backhaul network.

6. The method of claim 4 where the transmission format comprises a modulation and coding format of the received signal.

7. The method of claim 4 further comprising the steps of:
   reconstructing, by the base station, the received signal from the mobile terminal using the decoded data and the transmission format; and
   subtracting, by the base station, the reconstructed signal from a composite signal including the received signal and the other signals.

8. A base station of a wireless communication system comprising a plurality of other base stations, wherein the base station and the plurality of other base stations are adapted to communicate with each other and with one or more mobile terminals, the base station comprises:
- a receiver configured to:
  - receive a signal from a mobile terminal;
  - decode successfully the received signal into decoded data; and
  - transmit decoded data and a transmission format of the received signal from which the successfully decoded data was obtained to at least one of the other base stations, the transmission format including a number of retransmissions that were required for the base station to successfully decode the data, the decoded data and the transmission format being usable by the at least one of the other base stations to remove, from other signals received at the at least one other base station, interference attributable to transmission of the received signal.

9. The method of claim 8 wherein at least a plurality of the base stations of said communication system communicate with each other via a backhaul network.

10. The base station of claim 8 where the transmission format comprises a modulation format and a coding format.

11. The base station of claim 8 where the receiver is further configured to:
- reconstruct the received signal from the mobile terminal using the decoded data and the transmission format; and
- subtract the reconstructed signal from a composite signal including the received signal and the other signals.

12. A base station for use in a wireless communication system comprising at least one other base station, wherein the base stations are capable of communicating with each other, the base station comprises:
- a receiver configured to:
  - receive, from the at least one other base station, data that was successfully decoded by the at least one other base station from a received signal received by the at least one other base station from a mobile terminal, along with a transmission format of the received signal, said transmission format including a number of retransmissions that were required for the at least one other base station to successfully decode the data; and
  - remove, from other signals received at the base station, interference attributable to transmission of the received signal using the successfully decoded data and the transmission format.

13. The method of claim 12 wherein at least a plurality of the base stations of said network communicate with each other via a backhaul network.

14. The base station of claim 12 where the transmission format comprises a modulation and coding format of the received signal.

15. The base station of claim 12 where the receiver is further configured to:
- reconstruct the received signal from the mobile terminal using the decoded data and the transmission format; and
- subtract the reconstructed signal from a composite signal including the received signal and the other signals.

16. A base station of a wireless communication system comprising a plurality of other base stations, wherein the base station and the plurality of other base stations are adapted to communicate with each other and with one or more mobile terminals, the base station comprises:
- a receiver that receives signals from a mobile terminal;
- a decoder that successfully decodes the received signal into decoded data; and
- a transmitter which transmits successfully decoded data and a transmission format of the received signal from which the successfully decoded data was obtained to at least one of the other base stations, the transmission format including a number of retransmissions that were required for the base station to successfully decode the data, the decoded data and the transmission format being usable by the at least one of the other base stations to remove, from other signals received at the at least one of the other base stations, interference attributable to transmission of the received signals.

17. A base station for use in a wireless communication system comprising at least one other base station, wherein the base stations are adapted to communicate with each other, the base station comprises:
- a receiver adapted to receive, from the at least one other base station, (i) data having been successfully decoded by the at least one other base station from a signal received by the at least one other base station from a mobile terminal and (ii) a transmission format of the received signal, said transmission format including a number of retransmissions that were required for the at least one other base station to successfully decode the data; and
- a signal processor that removes, from other signals received at the base station, interference attributable to transmission of the received signal, using the successfully decoded data and the transmission format.

* * * * *